Aug. 6, 1940.  T. A. McGREGOR  2,210,727
ADJUSTABLE SUPPORT
Filed April 7, 1939  4 Sheets-Sheet 1
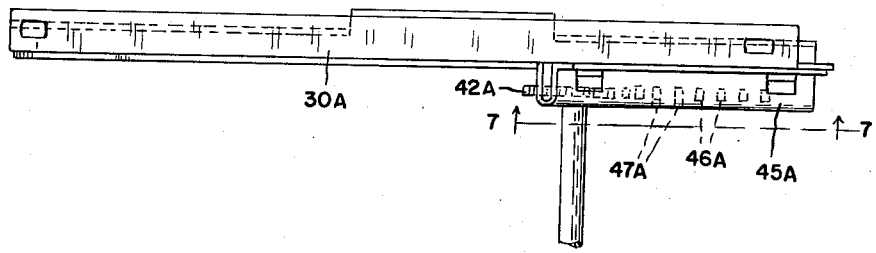
FIG.1.
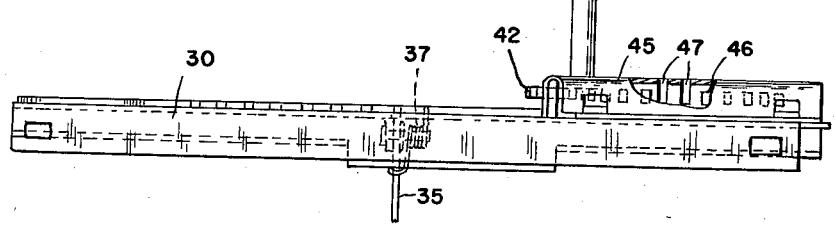
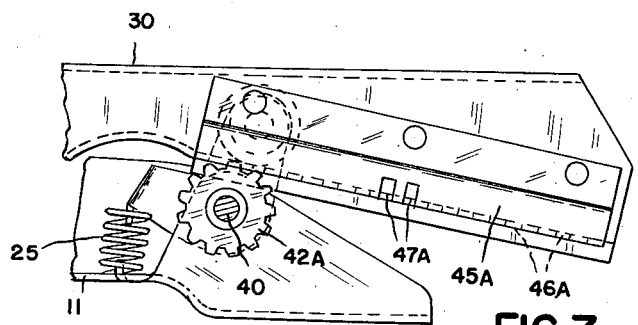
FIG.5.  FIG.7.
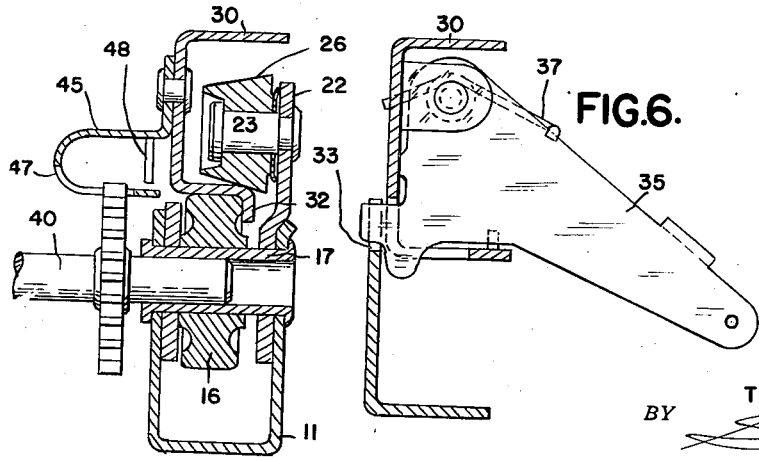
FIG.6.
INVENTOR
THOMAS A. McGREGOR
BY
ATTORNEYS Aug. 6, 1940.     T. A. McGREGOR     2,210,727
ADJUSTABLE SUPPORT
Filed April 7, 1939     4 Sheets-Sheet 2
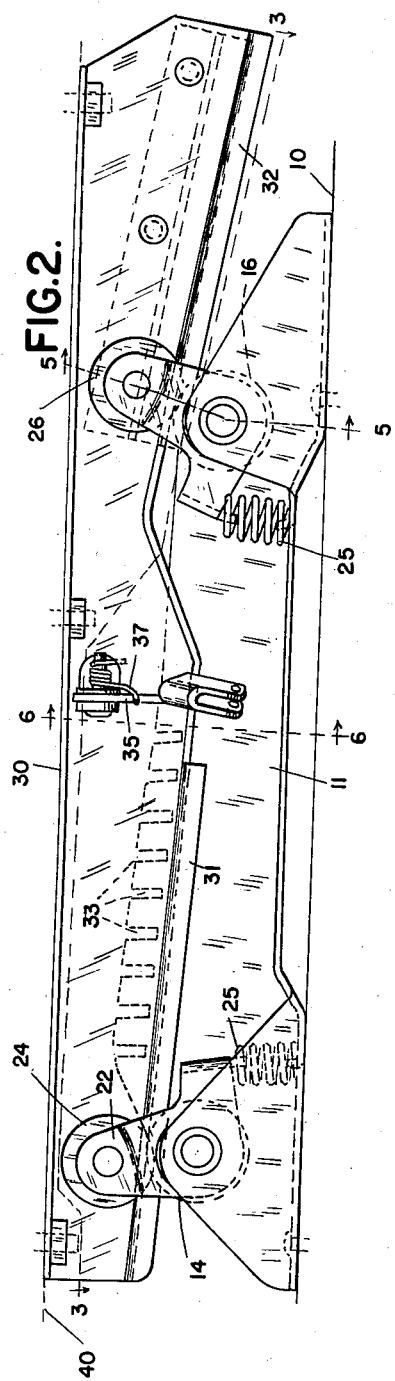
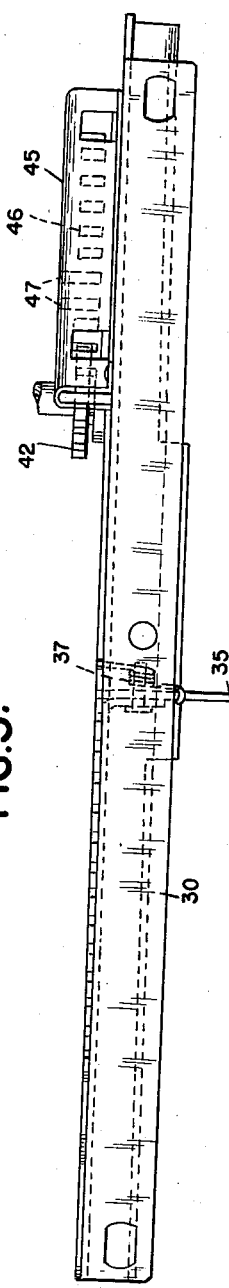
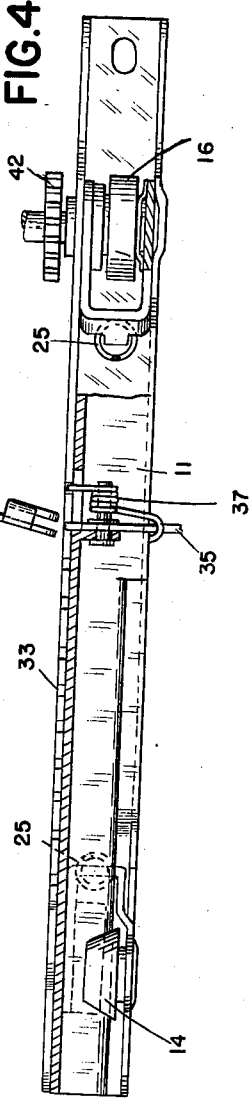
INVENTOR
THOMAS A. McGREGOR
BY
ATTORNEYS

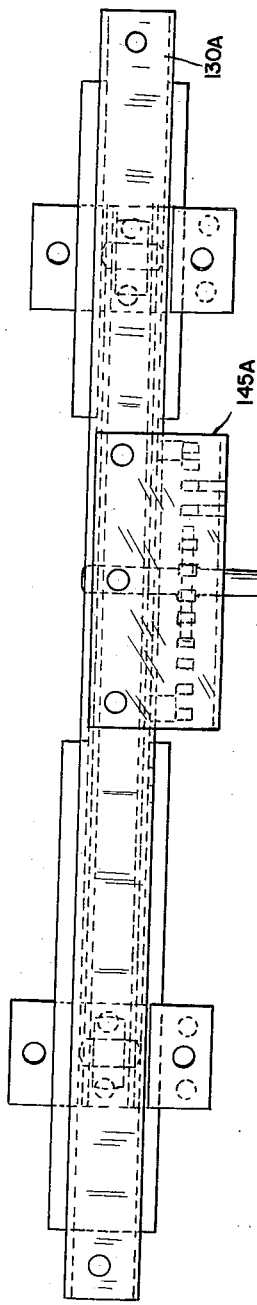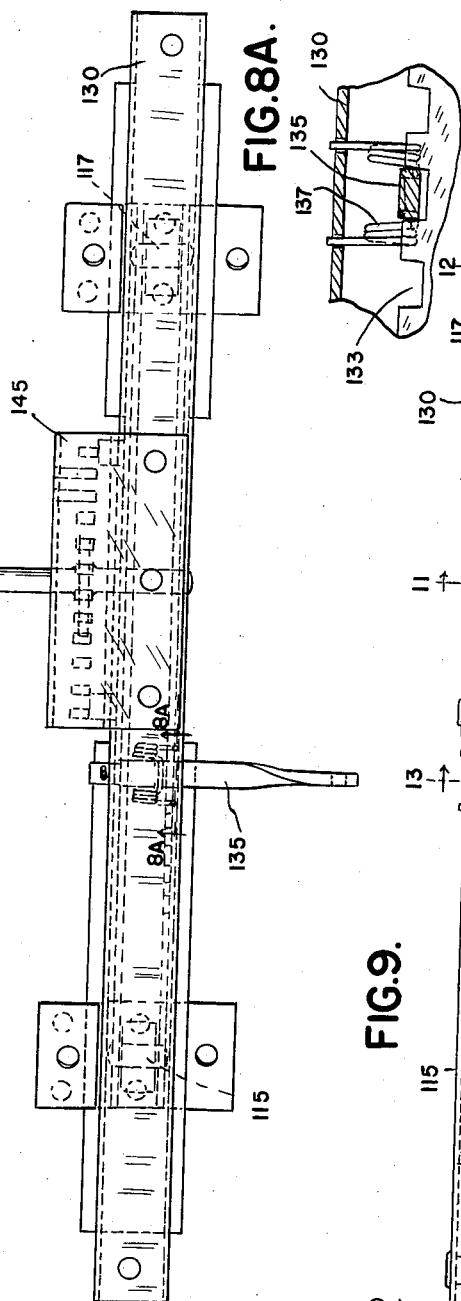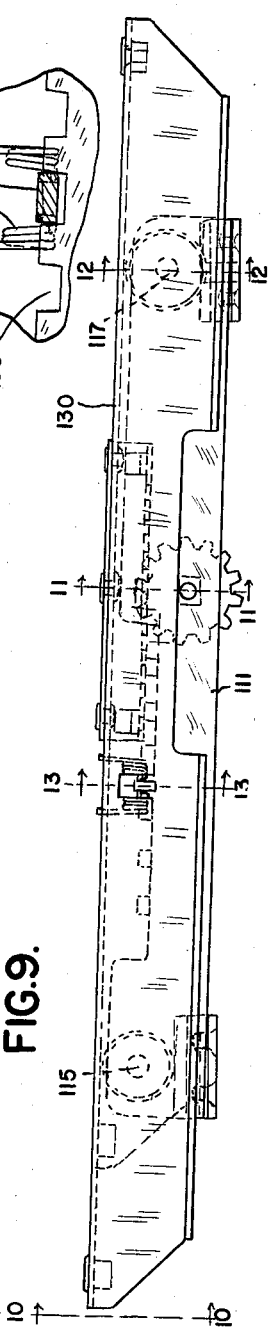

Aug. 6, 1940.   T. A. McGREGOR   2,210,727
ADJUSTABLE SUPPORT
Filed April 7, 1939   4 Sheets-Sheet 4
FIG.11.
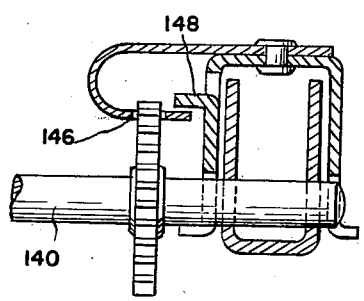
FIG.12.
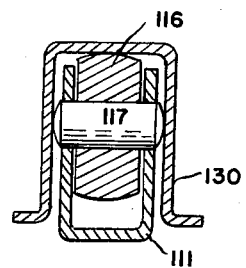
FIG.10.
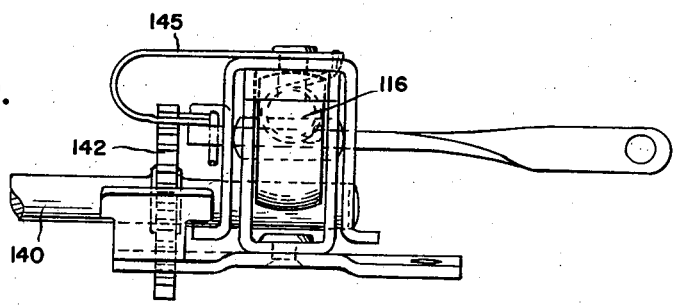
FIG.13.
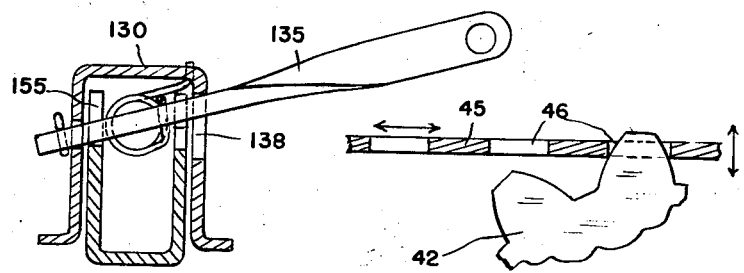
FIG.14.
*INVENTOR*
THOMAS A. McGREGOR
BY
*ATTORNEYS*

Patented Aug. 6, 1940

2,210,727

UNITED STATES PATENT OFFICE 2,210,727

ADJUSTABLE SUPPORT

Thomas A. McGregor, Pontiac, Mich., assignor to The American Forging and Socket Company, Pontiac, Mich., a corporation of Michigan Application April 7, 1939, Serial No. 266,575

6 Claims. (Cl. 155—14)

This invention relates to supporting devices for vehicle seats, and for other objects which require mounting means permitting ready adjustment of the supported object when desired, yet normally providing a very rigid mounting.

An important object of the present invention is to provide improved means for taking up lost motion between and preventing rattling of the parts of such a supporting mechanism.

In the mounting of vehicle seats it is now the common practice to employ two supporting assemblies, one for each end of the seat, and to incorporate locking means in only one of such assemblies although the locking means acts to hold both assemblies against movement; cross-connecting means between the two assemblies being provided to transfer the locking effect, and also to synchronize the movement of the two ends of the assembly when the locking means is released. The synchronizing action prevents jamming of the mechanism due to turning of the seat. An important object of the present invention is to so improve the cross-connecting and synchronizing means as to eliminate play and lost motion therein, and attain more accurate control and correlation of the movements of the opposite ends of the seat. A related object is to eliminate rattling and play from all parts of the apparatus.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a plan view of a seat supporting assembly constructed in accordance with the present invention, the synchronizing shaft being centrally broken away.

Figure 2 is a side elevational view of that one of the supporting assemblies which incorporates the locking mechanism.

Figure 3 is an enlarged plan view of such assembly.

Figure 4 is a horizontal section taken substantially on the line 4—4 of Figure 2, and looking in the direction of the arrows.

Figures 5 and 6 are vertical cross sectional views taken substantially on the lines 5—5, 6—6, respectively of Figure 2, and looking in the direction of the arrows.

Figure 7 is a fragmentary elevational view of the inner face of one of the supporting assemblies, taken substantially as indicated by the line and arrows 7—7 of Figure 1.

Figure 8 is a plan view similar to Figure 1, of a somewhat modified construction.

Figure 8A is a sectional detail taken substantially on the line 8A—8A of Figure 8, and looking in the direction of the arrows.

Figure 9 is a side elevation thereof, corresponding to Figure 2.

Figure 10 is a front elevational view thereof.

Figures 11, 12 and 13 are vertical sectional views taken respectively on the lines 11—11, 12—12, and 13—13 of Figure 9, and looking in the direction of the arrows.

Figure 14 is a fragmentary sectional detail upon an enlarged scale of the interengaging rack and pinion portions of the synchronizing mechanism.

Referring now to the drawings, and particularly to Figures 1 to 7 inclusive, showing a preferred embodiment of the invention, it will be seen that two assemblies are provided, each including a track portion 11, and a carriage portion 30. These are spaced and arranged to support a vehicle seat 40 for longitudinal movement in the manner now customary, the track being attached to a floor 10 of the vehicle (the remainder of which is unshown). The two assemblies being similar (although symmetrically opposite) in their construction and arrangement, except for the addition of the locking means to one, the description will be confined to the assembly incorporating the locking means.

The construction and mounting of the supporting means may correspond to the disclosure of the co-pending application of Walter S. Saunders, Serial Number 266,576, filed April 7, 1939, although the parts in question are subject to variation, since the present invention is primarily concerned with the synchronizing and cross-connecting means.

In addition to the main supporting rollers 14, 16, journaled in the track assembly, take-up rollers 24, 26 are provided, overengaging the bottom flange of the carriage channel and pressing it downwardly upon the rollers 14, 16, as well as laterally, to take up all clearance in the roller mountings and between moving parts. The take-up rollers are pressed down by springs 25 acting upon the swingable bell-crank levers 22 which serve to support such rollers, and due to their frusto-conic shape, the take-up rollers also, by cam action, urge the carriage channel laterally. The bottom flange of the carriage element is turned down beside the supporting rollers, as indicated at 31, 32, and such down-turned flanges limit lateral movement of and position the carriage. The bellcranks 22 upon which the take-up rollers are journaled are fulcrumed on the tubular axles 17 which support the main rollers.

A locking arm 35 pivoted on the carriage is provided with a detent tooth 34 movable into and out of engagement with slots 33 in the top of the track. This arrangement will be seen to hold the carriage rigidly against movement when the arm is in the locked position, in which it is normally maintained by the springs 37.

The carriage of the opposite supporting assembly is designated 30A. A rack portion 45 is attached to the inside face of the carriage 30 and a similar rack 45A is attached to the inner face of the carriage 30A. Each such rack comprises a spring steel member of U-cross section, only the top flange of which is secured to its supporting carriage, the bottom flange being free to flex vertically, although lugs 48 may be provided to limit the upward flexing. A series of perforations 46, 46A is provided in the bottom flange of each of the rack members to serve as rack teeth. Gears 42, 42A mesh with the racks 45, 45A respectively, one gear being rigidly attached to each end of the synchronizing shaft 40 which extends between the two assemblies, and is journaled in the hollow shaft as 17 which supports the rear fixed roller and bellcrank. Certain of the rack openings, as 47, 47A are elongated inwardly far enough so that when the carriages are in such position that these slots align with the axis of shaft 40, they permit the gears to be slid into mesh and the projecting ends of the shaft simultaneously to be inserted in the supporting tubes 17.

The rack portions 45, 45A are so formed that the bottom flange is somewhat flexed by insertion of the gear in the manner described, and constant downward pressure exerted upon the gears by the bottom flanges of the racks takes up all play, not only between the racks and gears, but in the shaft bearings as well.

In the somewhat modified construction shown in Figures 8 to 13 inclusive, each track element consists of a sheet metal channel 111 between whose upstanding side flanges rollers 114, 116 are journaled, on cross pins 115, 117. Each carriage element consists of a wider channel as 130, 130A, inverted over the track channel and resting upon the rollers. The pins 115, 117 project far enough at their ends to space the side webs of the track and carriage channels and prevent unwanted sliding friction therebetween.

In one of the carriages a locking arm 135 is pivoted upon one of the side webs and slidable in a vertical slot 138 in the other. The side webs of the track channel adjacent the pivoted end of the locking arm is cut away, as indicated at 155, far enough to permit free movement of the arm 135 along the track as the carriage slides, although the ends of such cut out area limit the path of movement of the carriage. The opposite web of the track channel is provided at its top with a plurality of notches 133 in which the locking arm may be selectively engaged to hold the carriage in any of a plurality of adjusted positions.

A resilient rack element 145, 145A is attached to and projects inwardly from each carriage, the upper flange of each rack being elongated and fastened as by means of rivets 154 to the cross web of the carriage element. The bottom flange of each rack element is vertically flexible, although its upward movement is limited by a lug 148 struck out of the side flange of the carriage. A series of perforations 146 in the bottom flange of the rack element provides rack teeth with which mesh the gears 142, 142A, one fast on each end of the synchronizing shaft 140. The shaft is journaled at its ends in the track channels in analogous manner.

The teeth of the gears fit the rack holes snugly, as shown in Figure 14, and due to the taper of the teeth and the resiliency of the rack, wear is constantly taken up so that no clearance can develop to cause rattling. It should also be noted that due to its shape, the rack has a certain amount of longitudinal resiliency which, while it opposes independent longitudinal movement of the end of the seat farthest from the locking means, allows a slight movement, with flexing of the racks, under severe strains and/or vibration. This eliminates hammering, heavy vibration and stresses which would otherwise tend to cause undue wear and looseness.

Other portions of the modified embodiment equivalent to parts already described have been given reference characters corresponding but one hundred integers higher, and require no detailed redescription.

I am unaware that the invention may be embodied in other specific forms without departing from the spirit or essential attributes thereof, and I therefore desire the present embodiments to be considered in all respects as illustrative and not restrictive; reference being had to the appended claims rather than to the foregoing description to indicate the scope of the invention.

What I claim is:

1. In a supporting assembly for a seat or the like, in combination with a pair of spaced substantially parallel tracks, conformably spaced carriage members, one arranged to travel over each track, and means for substantially synchronizing the movements of said carriage members, including rack and pinion elements one carried by each track and the other by each carriage member, and a cross shaft connecting the pinion elements, and resilient mounting means for at least one of said rack elements tending to urge the same yieldably against the cooperating pinion element.

2. In a supporting assembly for a seat or the like, in combination with a pair of spaced substantially parallel supporting portions, conformably spaced carriage members, one arranged to travel over each supporting portion, and means for substantially synchronizing the movements of said carriage members, including rack and pinion portions, one of said portions being carried by each supporting portion and the other by each carriage member, and a cross shaft connecting the pinion portions, and resilient mounting means for at least one of said rack portions, said mounting means urging said rack portion yieldably against the cooperating pinion portion and also allowing limited longitudinal movement of said rack portion.

3. In a supporting assembly for a seat or the like, in combination with a pair of spaced, substantially parallel supporting portions, conformably spaced carriage members, one arranged to travel over each such supporting portion, and means for substantially synchronizing the movements of said carriage members, including rack and pinion portions connecting each carriage member to its supporting portion, and a cross shaft connecting the pinion portions, the pinion portions having tapered teeth capable of engagement with the rack portion without backlash, and resilient mounting means for at least one of said rack portions, said mounting means urging said rack portion yieldably against the cooperating pinion portion and yieldably opposing longitudinal movement of the rack portion and so restraining rotation of the pinion and movement of the connected opposite carriage member.

4. In a supporting assembly for a seat or the like, in combination with a pair of spaced, substantially parallel supporting portions, conformably spaced carriage members, one arranged to travel over each such supporting portion, and means for substantially synchronizing the movements of said carriage members, including rack and pinion portions connecting each carriage member to its supporting portion, and a cross shaft connecting the pinion portions, the teeth of the rack and pinion portions having tapered portions yieldably urged together whereby they engage without backlash, and resilient mounting means for at least one of said rack portions, said mounting means urging said rack portions yieldably against the cooperating pinion portion and yieldably opposing independent longitudinal movement of the rack portion.

5. Means as set forth in claim 4 in which said shaft is journaled in said supporting portions and the pinion portions are fast thereupon, one pinion portion being adjacent each carriage member, and each rack portion comprising a flexible metallic spring member of substantially U-section, secured along one leg of the U to one of the carriage members, the other leg of the U being free to flex and carrying portions which mesh with the cooperating pinion portion.

6. Means as set forth in claim 4 in which said shaft is journaled in said supporting portions and the pinion portions are fast thereupon, one such pinion portion being adjacent each carriage member, each rack portion comprising a flexible metallic spring member of substantially U-section, secured along one leg of the U to one of the carriage members, the other leg of the U being free to flex and carrying portions which mesh with the cooperating pinion portion, the rack portion being stressed to urge the meshing portions together and prevent looseness in the journals of the shaft.

THOMAS A. McGREGOR.